US008293338B2

(12) United States Patent
Castelli et al.

(10) Patent No.: US 8,293,338 B2

(45) Date of Patent: Oct. 23, 2012

(54) APPLYING A TRANSPARENT PROTECTIVE COATING TO MARKED MEDIA IN A PRINT ENGINE

(75) Inventors: Vittorio Castelli, Yorktown Heights, NY (US); Gregory Joseph Kovacs, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1008 days.

(21) Appl. No.: 12/103,179

(22) Filed: Apr. 15, 2008

(65) Prior Publication Data

US 2009/0255460 A1 Oct. 15, 2009

(51) Int. Cl.
*C08F 2/46* (2006.01)
*C08F 2/48* (2006.01)

(52) U.S. Cl. ........ 427/487; 427/461; 427/466; 427/493; 427/514; 430/33; 430/124.1; 430/124.13

(58) Field of Classification Search .................. 427/461, 427/466, 487, 493, 514; 430/33, 124.1, 124.13
See application file for complete search history.

(56) References Cited

U.S. PATENT DOCUMENTS

| | | | | |
|---|---|---|---|---|
| 5,804,671 | A | 9/1998 | Dones et al. | |
| 6,106,623 | A * | 8/2000 | Nishikawa | 118/673 |
| 7,063,882 | B2 * | 6/2006 | Mossbrook et al. | 428/203 |
| 7,521,165 | B2 * | 4/2009 | Anderson et al. | 430/126.1 |
| 2003/0054103 | A1 * | 3/2003 | Sato et al. | 427/256 |
| 2003/0170408 | A1 * | 9/2003 | Egan | 428/34.2 |
| 2004/0191489 | A1 * | 9/2004 | Minato et al. | 428/204 |
| 2005/0249895 | A1 * | 11/2005 | Sisler et al. | 428/32.34 |
| 2005/0250038 | A1 * | 11/2005 | McAneney et al. | 430/124 |
| 2005/0261391 | A1 * | 11/2005 | Narayan-Sarathy et al. | 522/173 |
| 2007/0120910 | A1 | 5/2007 | Odell et al. | |
| 2007/0120925 | A1 | 5/2007 | Belelie et al. | |
| 2008/0041275 | A1 * | 2/2008 | Hansen et al. | 106/464 |
| 2009/0081465 | A1 * | 3/2009 | Morgenstern et al. | 428/411.1 |
| 2009/0104373 | A1 * | 4/2009 | Vanbesien et al. | 427/553 |
| 2009/0162555 | A1 * | 6/2009 | Halfyard et al. | 427/288 |

FOREIGN PATENT DOCUMENTS

DE 199 29 273 A1 12/2000

OTHER PUBLICATIONS

Wolfhard Wehr, European Search Report for EP 09 15 3502, Aug. 19, 2009, 6 pages, The Hague.

* cited by examiner

*Primary Examiner* — Charles Boyer
(74) *Attorney, Agent, or Firm* — Fay Sharpe LLP

(57) ABSTRACT

A method of applying a protective coating over ink printed media in a digital printing engine whereby horizontally discharging ink jet nozzles arranged in a vertical array, discharging a protective coating onto the marked surface of media disposed on a belt in vertical disposition. The coated media is then transported vertically to an adjacent source of ultraviolet radiation for curing the protective coating.

12 Claims, 4 Drawing Sheets

APPLYING A TRANSPARENT PROTECTIVE COATING TO MARKED MEDIA IN A PRINT ENGINE

BACKGROUND

The present disclosure relates to providing protection for ink printing on sheet media, both on electrostatically printed sheets and on ink jet printed sheets in a photocopier/printer.

Heretofore, it has been desired to provide a fixative coating over the ink printing on the sheets discharged from digital printing on a print engine, particularly colored ink printing, to preserve the ink marking and prevent smudging or other damage to the inked surface of the print media. For example, it has been desired to protect the printing from abrasion in the transport of the printed sheets from the print engine. Attempts to protect the surface of ink printed media have attempted the use of aqueous flexovarnishing; however, the high water content of such aqueous mixtures have required substantial amounts of drying, thereby increasing the size and cost of the equipment and has delayed the speed of transport rendering the process unworkable for high speed printing applications.

The problem of providing a protective coating for inked print media has further been complicated by the need to accommodate print media of both plain paper and coated paper sheet stock in widespread use in digital print engines.

Known processes for applying an aqueous flexovarnish coating on inked print media have required relatively long equipment modules with prohibitively large space requirement and thus have not been practical for many digital printing installations. Furthermore, the requirement for changing the flexible plates and the necessity of cleanup operations each time the sheet format is changed have rendered such a process cumbersome and prohibitive for small print engine installations.

Thus, it has been desired to provide a way of applying a transparent protective coating to inked print media in digital printing operations in a manner which does not require large equipment installations and does not require a reduction in the speed of the copying/printing operation.

BRIEF DESCRIPTION

The present disclosure provides an improved way or means of applying a protective coating on inked print media in a manner which requires only a slight extension of existing print engine equipment installations. The disclosed method can accommodate the normal operating speed of the print engine without requiring reduction in the speed and loss of productivity. In addition the present disclosure provides a means of protecting the printed surface of both plain and coated papers.

The process of the present disclosure provides a vertically disposed array of horizontally discharging ink jet nozzles for coating a marked sheet of print media disposed on a transporter belt; and, a source of radiant energy is disposed vertically adjacent the ink jet array and effects curing of the coating as the belt transports the marked print media through the designated path in the print engine. For duplex printing, another array of horizontally discharging ink jet nozzles is disposed downstream in the direction of transport print media for discharging a protective coating on the reverse side of the printed media with a second source of radiant energy disposed adjacent thereto for effecting curing of the coating on the reverse side of the print media. The term “duplex” is used in the digital copying and duplicating industry as the term “pefecting” is used in the conventional printing industry. Both terms indicate printing on both sides of a sheet media. A source of vacuum is provided and a vacuum is drawn through the transporter belt to maintain the print media attached thereto during the curing by the source of radiant energy. The protective coating discharged through the ink jet nozzles is of the type sensitive to ultraviolet radiation. The source of radiant energy is of the type generating radiant energy in the ultraviolet spectrum by means of a UV lamp disposed adjacent the printed media, with a heat exchanger provided with water circulated therethrough provided for cooling the UV lamp. The present disclosure embodies the concept of horizontally discharging ink jet nozzles. This orientation is chosen in order to minimize the horizontal extent of the print engine. However, other functional orientations of the ink jets may be employed. A gel varnish is employed which enables applying a protective coating on plain paper; as, the gel will freeze when it hits the paper surface and not penetrate through the plain paper pores resulting in showthrough and incomplete cure, both of which are unacceptable. The gel varnish has been found to also be satisfactory for coating ink marked coated papers.

DETAILED DESCRIPTION

Figure 1:
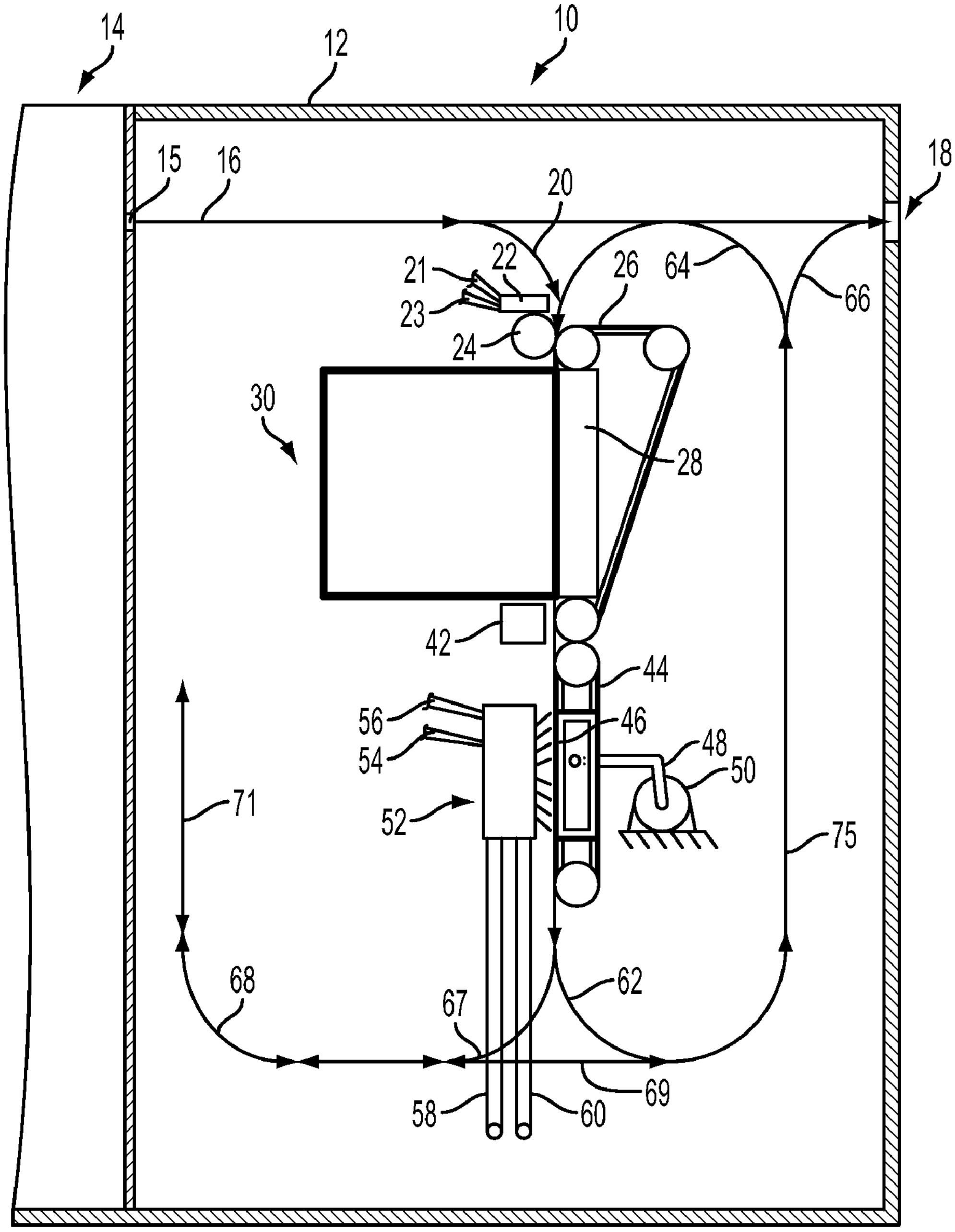
FIG. 1 is a pictorial schematic of the path of the printed media through a print engine for applying and curing a protective coating according to the present disclosure.

Referring to FIG. 1, an added equipment portion indicated generally at 10 is provided housed in a cabinet 12 which may be in addition to an existing print engine indicated generally at 14. It is intended that the cabinet portion 12 will extend vertically to the same height as the existing structure 14; and thus the cabinet 12 may comprise a matching addition to one side on existing print engine. The output transporter path of the print sheet media from the engine 14 is indicated by the black arrow line 16 emanating from a print engine output station 15 and may extend directly through the cabinet 12 to the output station indicated generally at 18. However, where it is desired to provide a protective coating on the ink marked media sheet, the media may be diverted by a suitable gate (not shown), as is known in the art, to the downward path denoted by reference numeral 20. A sensor 22 is disposed to detect the presence/passage of a print media sheet and provides a signal on output leads 21, 23 indicative of media sheet transport to a tacking roller 24 which electrostatically adheres the sheet to an endless belt 26. The belt 26 is motorized and is operative to transport a media sheet for passage over a stationary platen 28 which is positioned closely spaced adjacent a coating unit, indicated generally at 30, which will be described hereinafter in greater detail. Sensor 22 detects not only the presence but also the position and angular attitude of the sheet media, thus enabling the ink jet coating apparatus to distribute its coating to the sheet media precisely and thereby minimizes over-coverage or under-coverage.

Figure 3:
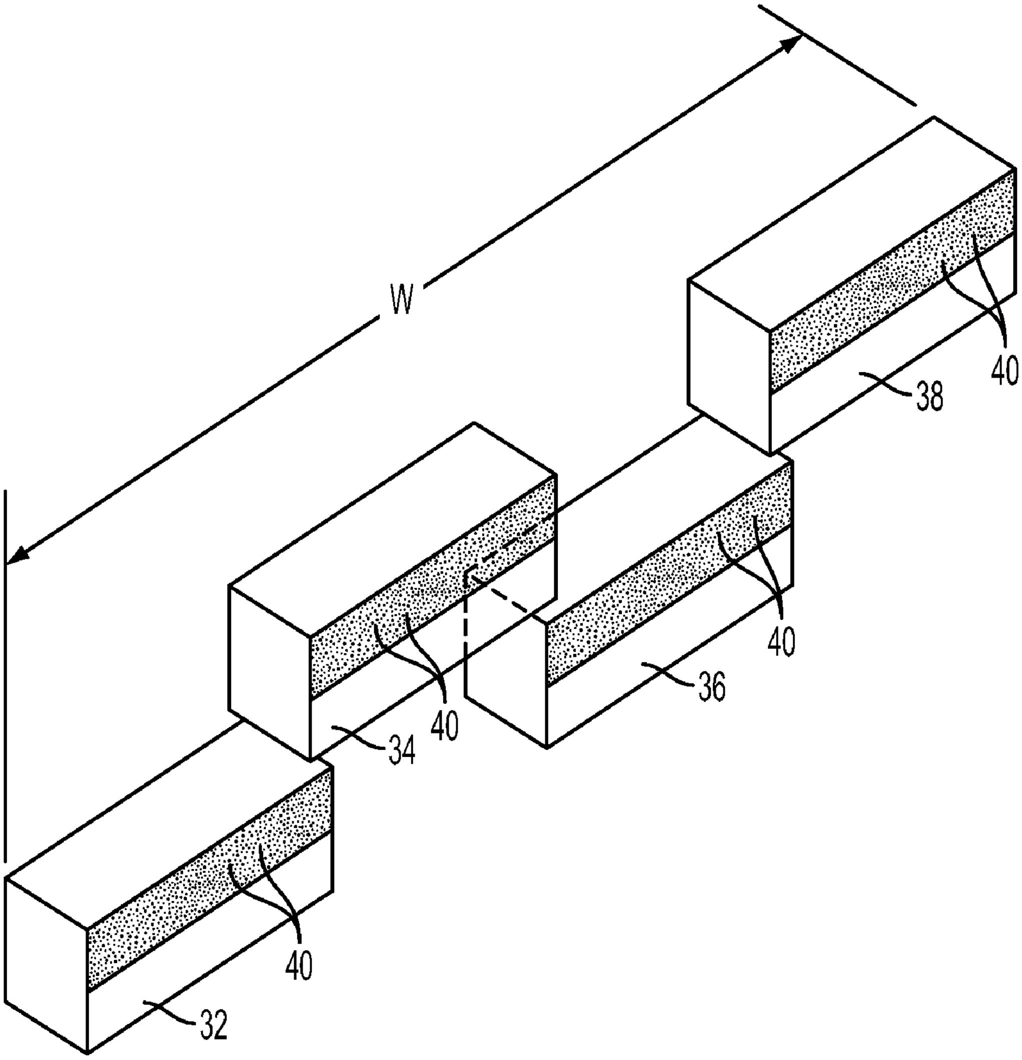
FIG. 3 is an axonometric view of a full width array of ink jet nozzles employed in the method of the present disclosure.

Referring to FIGS. 1 and 3, the coating unit is indicated generally at 30 and comprises a plurality of ink jet printhead modules 32, 34, 36, 38 which may extend the full width of the print media, as denoted by the reference character W in FIG. 3. In the present practice, it has been found satisfactory that each of the printheads has a length in the direction of the W of about 3"; and, thus four such modules will accommodate print sheet stock having a width of 12". In typical applications the modules 32, 34 36, and 38 cannot be active up to their ends, thus requiring that the modules be disposed in a staggered array with a limited amount of lateral overlap for complete coverage. In the present practice, it has been found satisfactory to provide two rows of the array 30, disposed vertically adjacent, for adequate coating coverage. In the present practice, the printhead modules have sufficient nozzles 40 to deposit the coating material in a matrix comprising 300×1200 dots per inch (dpi) at speeds of up to 70 prints per minute (ppm) and provide full coverage of the coating in a single pass. At higher print engine speeds of about 140 to 150 ppm, a second set of printing modules spaced relative to the first may be needed to deposit the coating in a matrix of 600×600 dpi or 600×1200 dpi to give full coverage in a single pass. In the present practice, the single printhead arrangement shown in FIG. 3 has a vertical height or thickness of about 8"; and, consequently, two rows of printhead modules will have a vertical height or depth of about 16". For high speed printing where two arrays are required, the vertical height or depth will be about 16" for each of two arrays, each with two rows of modules. If the sheet media requires coating on both of its sides, it can be diverted by a suitable gate (not shown) to path 67 toward the left and then to path 68 which is dead-ended. The sheet media can then restarted in the opposite direction of travel as indicated by the double-ended arrow and, through a suitable gate (not shown) travel on horizontal path 69 and then on the vertical path 75 leading to a gate (not shown) which allows it to follow path 64 and traverse the coating station a second time. The path 68 is commonly called an "inverter" because it is utilized to switch the sheet sides on which the apparatus operates.

Duplex printing as aforementioned with the arrangement of FIG. 1, is generally employed in relatively slow printing operations; as, the time required for inverting limits the media transport speeds.

In the present practice, it has been found satisfactory to employ a transparent protective gelatinous coating comprising an initiator, and a vehicle, said vehicle comprising (a) at least one radically curable monomer compound, and (b) a compound of the formula

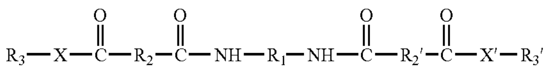

wherein R1 is an alkylene, arylene, arylalkylene, or alkylarylene group, R2 and R2' each, independently of the other, are alkylene, arylene, arylalkylene, or alkylarylene groups, R3 and R3' each, independently of the other, are either (a) photoinitiating groups, or (b) groups which are alkyl, aryl, arylalkyl, or alkylaryl groups, provided that at least one of R3 and R3' is a photoinitiating group, and X and X' each, independently of the other, is an oxygen atom or a group of the formula —NR4—, wherein R4 is a hydrogen atom, an alkyl group, an aryl group, an arylalkyl group, or an alkylaryl group.

U.S. Patent Publication No. 2007-0120910, published May 31, 2007, in the names of P. G. Odell et al., entitled "Phase Change Inks Containing Photoinitiator With Phase Change Properties And Gellant Affinity," which is incorporated by reference herein, describes an ink composite as above which may be modified by omitting the colorant to provide a satisfactory transparent protective coating for ink marked print media.

The protective gelatinous coating may also comprise an initiator, and a phase change carrier, said carrier comprising at least one radically curable monomer compound and a compound of the formula

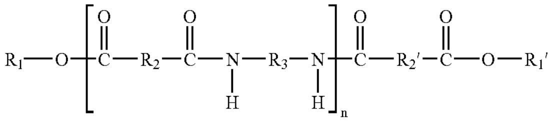

U.S. Patent Publication No. 2007-0120925, published May 31, 2007, in the names of J. L. Belelie et al., entitled "Radiation Curable Ink Containing A Curable Wax," which is incorporated by reference herein, describes a radiation curable ink, which, in accordance with the above, may be modified by eliminating the colorant to provide a satisfactory transparent protective coating for ink marked print media.

Although a gelatinous coating has been described herein, it is contemplated that other non-gelatinous coating materials may be employed in the present method.

On completion of the coating by the nozzle array 30, the print media sheet is moved downwardly past a de-tacking unit 42 which reverses the electrostatic charge on the print media to allow traverse of the print media to a second endless belt 44 which passes over a porous stationary platen 46. The platen 46 is connected through conduit 48 to a vacuum pump 50 which, through the porosity of the platen 46 and the belt 44, causes the sheet stock to adhere to the platen and remain in the vertical position thereon.

A radiant energy source 52 is disposed proximate the platen 46 and is operable upon electrical energization through leads 54, 56 to emit suitable radiant energy to effect curing of the coating on the print media adjacent thereto. The source of radiant energy 52 is in the present practice a lamp radiating energy in the ultraviolet spectrum; and, the lamp is water-cooled through tubes 58, 60 which are adapted for connection to an external source of coolant (not shown) to be circulated therethrough. On completion of curing of the coating by the source of radiant energy 52, the coated print media is moved downwardly along path 62 and routed upwardly either for re-circulating through path 64 for recoating or outwardly along path 66 through the output station 18.

Figure 4:
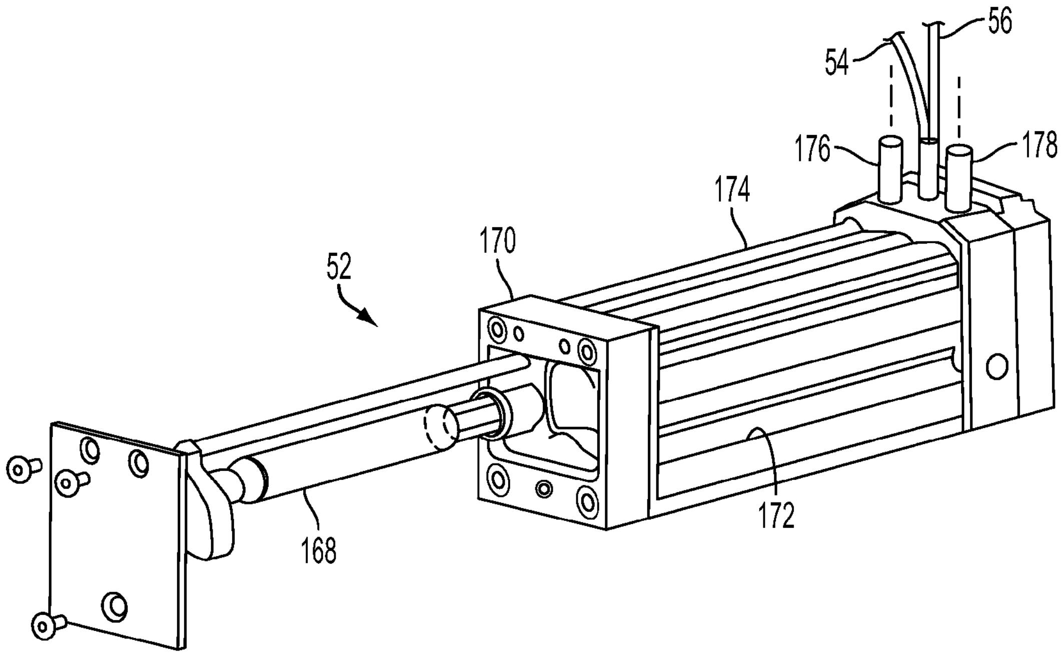
FIG. 4 is an axonometric exploded view of a heat exchanger for water cooling a UV lamp employed in the present disclosure.

Referring to FIG. 4, the source of radiant energy indicated generally at 52 is illustrated in exploded view and includes a bulb 168 connected to leads 54, 56 and contained in a heat exchanger housing 170 which has an elongated slot 172 which permits the radiant energy from bulb 168 to exit the housing 170. The housing 170 includes circulating coolant tubes such as tubes 174 which tubes are connected to an inlet fitting 176 and an outlet or return fitting 178 which are respectively connected to the tubes 58, 60, shown in FIG. 1, for circulating coolant through the housing 70 to prevent overheating of the bulb 68.

Figure 2:
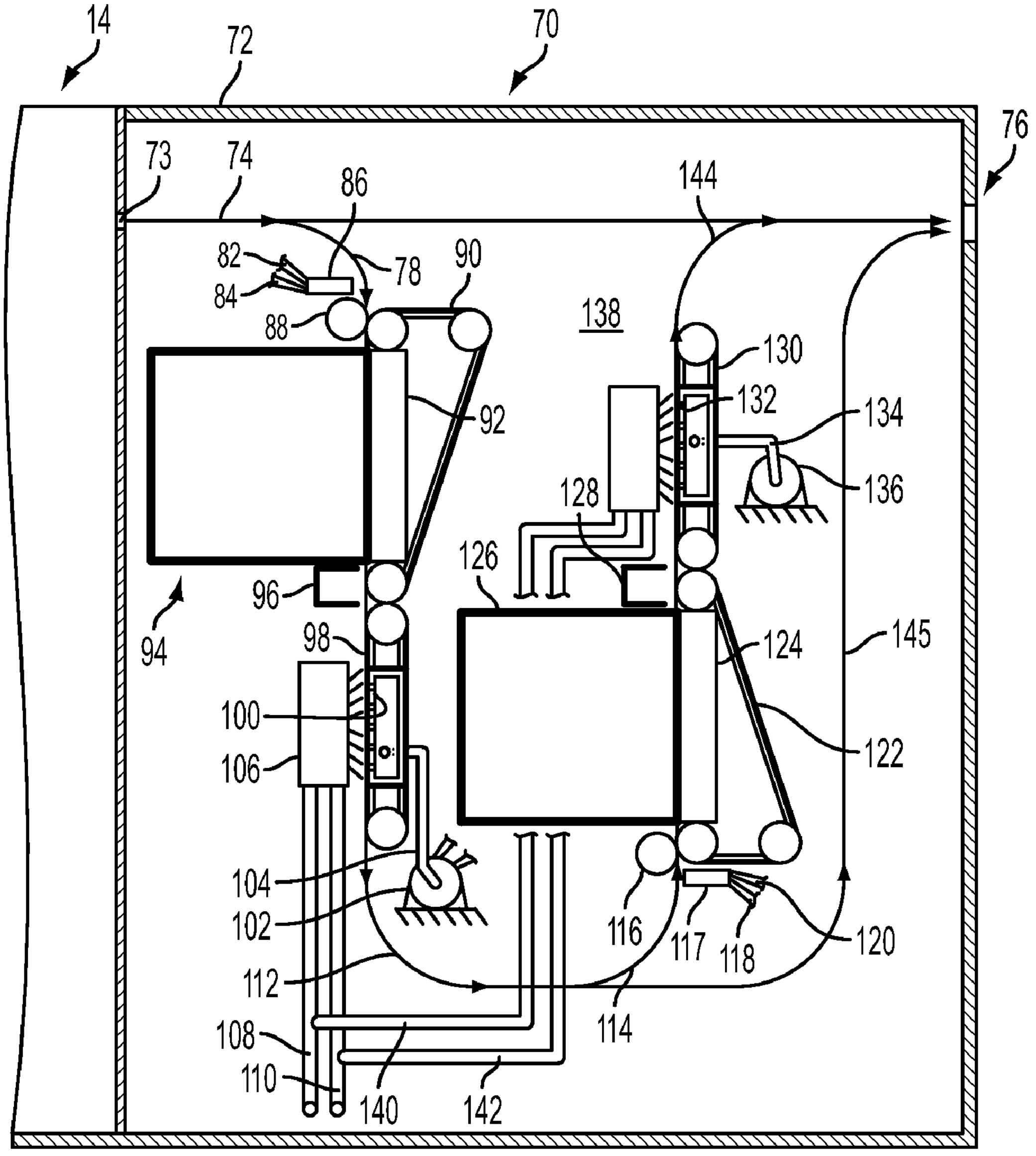
FIG. 2 is a view similar to FIG. 1 of a version of the present disclosure applying and curing a protective coating on duplex printed media.

Referring to FIG. 2, another embodiment of the technique of the present disclosure is indicated generally at 70 and has a cabinet 72 which may be attached to the existing print engine 14 from which it receives printed media from the print engine output station 73 and transports said media along path 74 to an output station indicated generally at 76 in an arrangement similar to the embodiment of FIG. 1.

For applying a protective coating in duplex printing, the sheet stock is diverted from the path 74 downwardly along the path 78 past a sensor 86 which outputs an electrical signal along leads 82, 84 to a controller (not shown) and, upon passing sensor 86, the media sheet passes over stacking roller 88 and is disposed onto the surface of an endless belt 90. The belt 90 passes the printed media sheet over a stationary platen 92 which is disposed vertically closely spaced from a coating unit 94. The coating unit 94 may be similar to the unit 30 described in FIG. 1 and employing printheads as described with respect to FIG. 3.

Upon completion of the coating by the printheads in the unit 94, the belt 90 moves the media sheet downwardly past a de-tacking unit 96, to remove the electrostatic charge applied by the tacking roller 88, and onto a second endless belt 98 which is porous. Belt 98 passes the sheet over a stationary platen 100, which is also porous and subjected to a vacuum by pump 102 through conduit 104, which vacuum retains the media sheet in position over platen 100. A first source of radiant energy 106 is disposed proximate the platen 100 and which may be similar to the radiant source 52 for emitting ultraviolet radiation and curing the coating on the print media. The ultraviolet energy source 106 is cooled by circulation of water through tubes 108, 110 connected thereto. Upon completion of the curing of the coating on the print media by unit 106, the print media is moved downwardly by belt 98 and from the belt 98 transported separately along path 112 and then upwardly along path 114 to a second tacking roller 116. The presence of the sheet stock is sensed at the tacking roller 116 by a sensor 117 which provides an electrical signal along the electrical leads 118, 120 to a controller (not shown) indicating media sheet presence.

The print media is subsequently moved from the tacking roller 116 onto a second endless belt 122 and is electrostatically adhered thereto for passage over and positioning adjacent a stationary platen 124. The print media then has a protective coating applied by the coating unit 126 which, it will be understood, is similar to the coating applied to the marking on reverse side of the printed media by unit 94. Upon application of the coating onto the reverse side of the print media, the media is moved by belt 122 past the de-tacking unit 128 and from there transported onto a second endless belt 130 positioned vertically above the coating unit 126. The belt 130 is passed over a stationary porous platen 132, which is connected via conduit 134 to a vacuum pump 136; and, the print media is adhered to the belt by the suction applied through the porous platen and through the porosity of the material of the belt 130. A source of radiant energy 138 is disposed proximate the platen 132 and comprises an ultraviolet source similar to the source 52 of FIG. 4. The ultraviolet source 138 is connected to coolant circulating tubes 140, 142 which are respectively connected to tubes 108, 110 for circulating water for cooling the ultraviolet lamp within the unit 138. Upon completion of the curing of the coating of the reverse side of the print media by the coating unit 126, the print media is moved upwardly along path 144 and outwardly to the output station 76. If a sheet media does not require coating on the reverse side, its path can be diverted by a suitable gate (not shown) from path 112 to path 145 and transport directly to the output station 76. The arrangement of FIG. 2 may be thus employed with relatively high speed printing operations by virtue of utilizing continuous print media transport and eliminates inverting in addition to accomplishing coating and curing simultaneously on different sides of two sheets.

The present disclosure thus describes a unique and novel way of rapidly applying a protective coating over printed media in a digital print engine by a minimal addition to an existing print engine that is relatively compact and permits the print engine to operate at normal speeds without any reduction of productivity.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of applying a transparent protective coating to an ink marked media sheet in a print engine comprising:

(a) disposing a plurality of nozzles in a vertical array for discharge;

(b) providing a gelatinous ink and removing colorant from the ink and preparing a transparent coating material therefrom;

(c) disposing an ink marked media sheet from the engine proximate the array and discharging the gelatinous coating material from the nozzles onto the marked surface of the media sheet;

(d) moving the coated sheet to a position vertically displaced from the array and irradiating the coating with radiant energy and effecting curing of the gelatinous transparent coating; and, (e) moving the coated media sheet to a discharge path for the print engine.

2. The method defined in claim 1, wherein the step of irradiating includes irradiating with energy in the ultraviolet spectrum.

3. The method defined in claim 1, wherein the step of moving the coated sheet to a position vertically displaced includes disposing the coated sheet on a porous belt and drawing a vacuum through the belt and securing the coated sheet to the surface of the belt.

4. The method defined in claim 1, further comprising moving the sheet to another vertical array of nozzles and discharging the coating material onto a marked surface of the media sheet; and, moving the media sheet to a position vertically displaced from the another vertical array and irradiating the coating and effecting curing thereof.

5. The method defined in claim 4, wherein the step of moving the coated sheet to a position vertically displaced includes moving the coated sheet vertically downward; and, the step of moving the inverted sheet to a position vertically displaced from the another vertical array includes moving the sheet vertically upward.

6. The method defined in claim 1, wherein the step of discharging includes depositing droplets in a matrix 300×1200 dots per inch.

7. The method defined in claim 1, wherein the step of discharging includes depositing droplets in a matrix 600×600 dots per inch.

8. The method defined in claim 1, wherein the step of irradiating includes irradiating with a source of ultraviolet radiation and disposing a liquid cooled heat exchanger for cooling the source.

9. The method defined in claim 1, wherein the step of moving includes disposing the media sheet on an endless belt.

10. The method defined in claim 1, wherein the step of disposing a plurality of nozzles in a vertical array includes disposing nozzles in a staggered array for the width of the media sheet.

11. The method defined in claim u her comprising:

sensing the position of the sheet proximate the array and controlling the nozzle discharge in response to the sensing for coating the sheet.

12. The method defined in claim 1, wherein the step of disposing nozzles in an array includes disposing nozzles for horizontal discharge.

* * * * *